J. W. WHITSETT.
TIRE ARMOR.
APPLICATION FILED JULY 13, 1914.
1,206,630.
Patented Nov. 28, 1916.
2 SHEETS—SHEET 1.
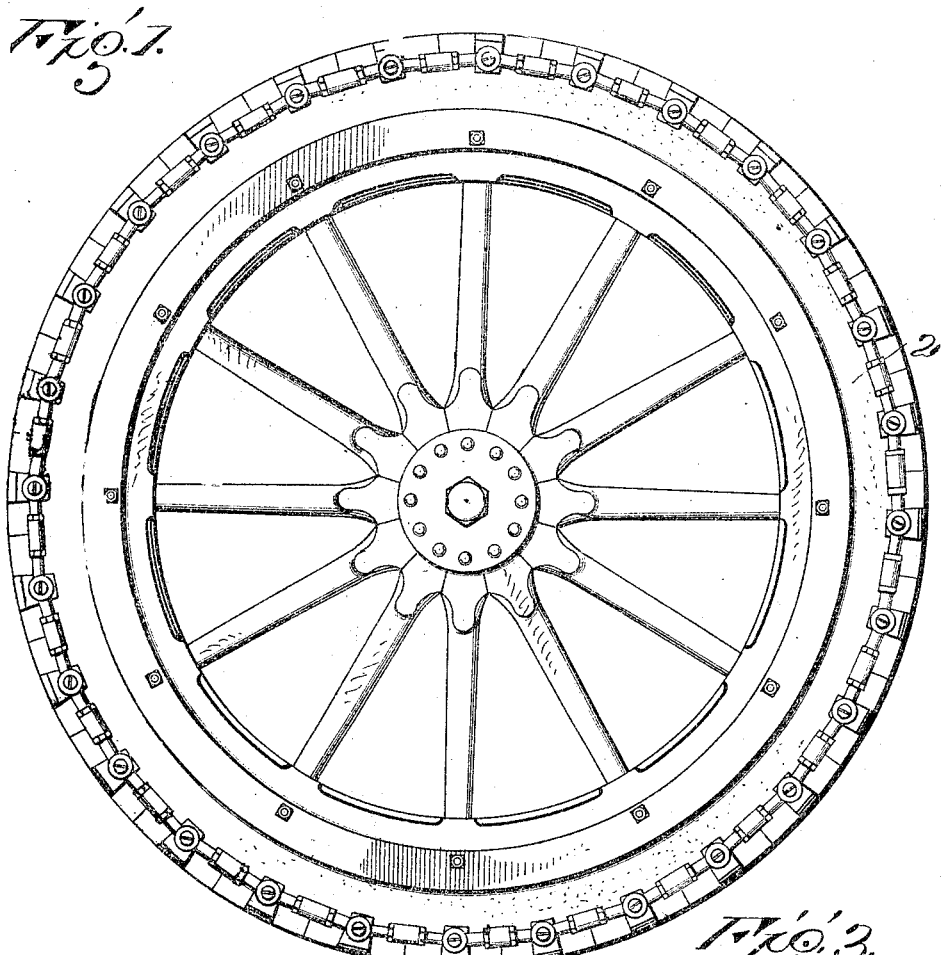
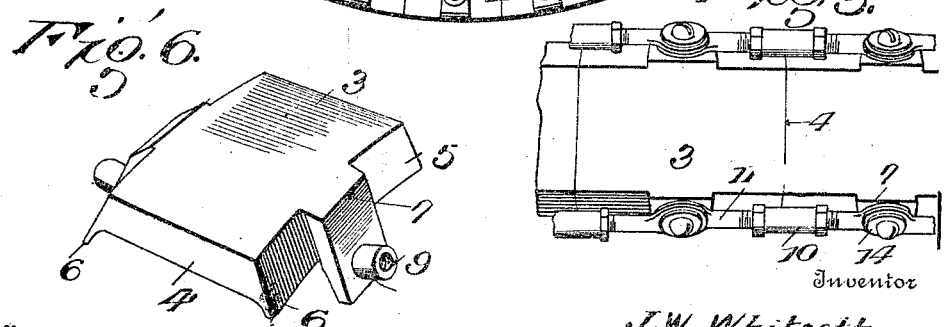
Inventor
J. W. Whitsett

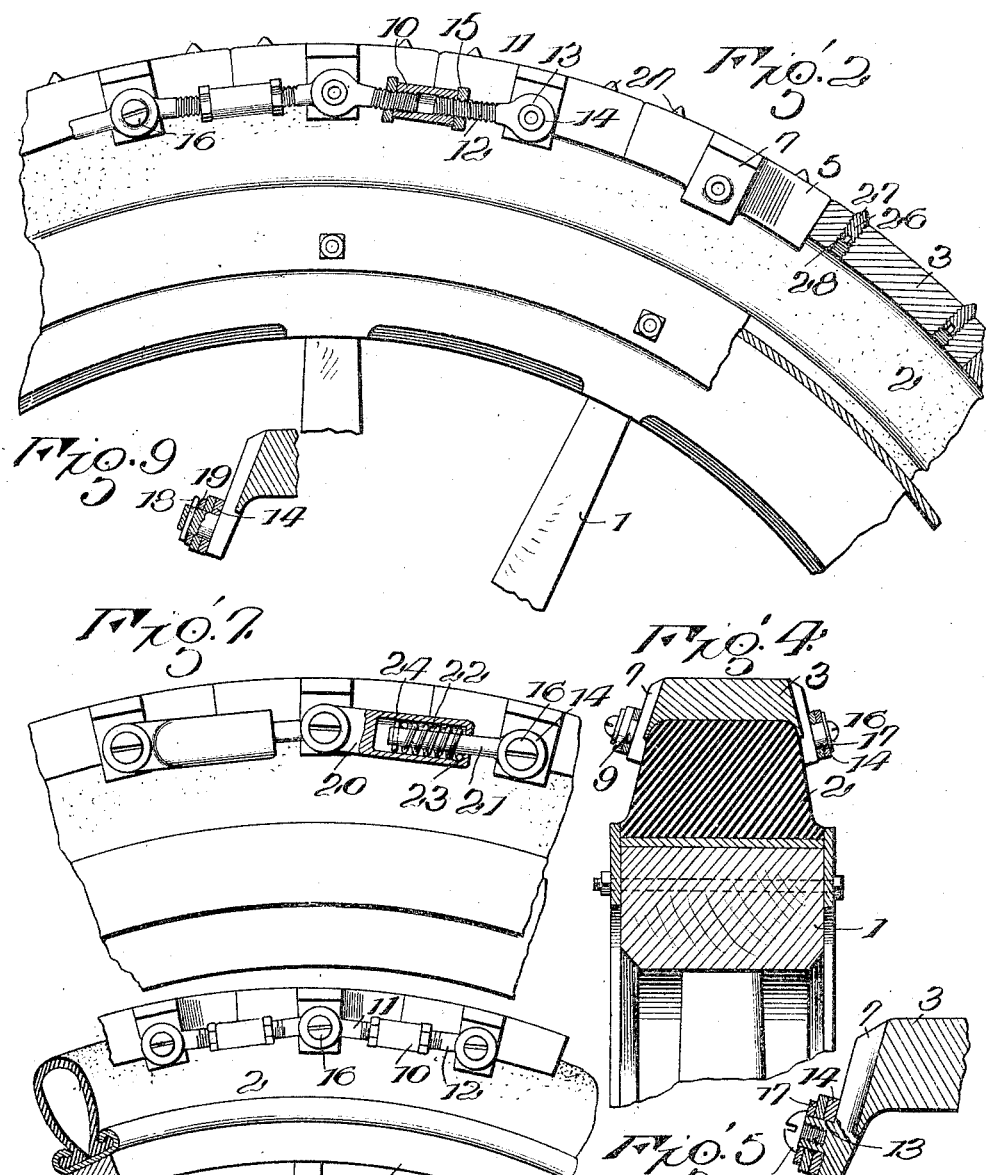

UNITED STATES PATENT OFFICE.

JAMES W. WHITSETT, OF BERKELEY, CALIFORNIA.

TIRE-ARMOR.

1,206,630.

Specification of Letters Patent.

Patented Nov. 28, 1916.

Application filed July 13, 1914. Serial No. 850,760.

*To all whom it may concern:*

Be it known that I, JAMES W. WHITSETT, a citizen of the United States, residing at Berkeley, in the county of Alameda and State of California, have invented certain new and useful Improvements in Tire-Armor, of which the following is a specification.

This invention relates to tire armor, and more particularly to tire armor of that type made up of a number of sections connected together in an annular series to surround the tread of the tire. Ordinarily in armor of this class, the sections are constructed to overlap each other at their contacting or adjacent ends or they are connected in spaced relation and in a flexible series. In either event, the relative movement of the sections is liable to result in the cutting of the tire or in the creation of heat through friction to such an extent as to deteriorate the rubber of which the tire is made. Another disadvantage possessed by armor constructed, as above pointed out, lies in the fact that the armor is liable to creep about the tire, thereby adding to the friction between the armor and tire. Furthermore, where the sections are loosely connected, there is liable to be considerable noise created as the wheels pass over inequalities in the road surface and unless the sections firmly embrace the tread of the tire sand or dirt is liable to accumulate between the contacting surfaces of the tire and armor and by its presence result in injury to the tire.

It is therefore the aim of the present invention to provide tire armor so constructed that the sections comprising the same will be connected in an annular series with their ends contacting but not so firmly as to prevent relative movement of the sections and therefore prevented from rubbing the surface of the tire, the armor being further so constructed as to snugly fit the tread surface of the tire in such a manner as to prevent creeping of the armor.

Another aim of the invention is to so construct the armor that it will effectually cover and protect the entire tread surface of the tire in such a manner as to insure against puncture and to provide a continuous and perfectly smooth running surface.

Another aim of the invention is to construct the armor in such a manner that any of the several sections comprising the same may be readily removed and replaced when repairs are necessary.

The invention also aims to provide means for connecting the sections of the armor in such a manner that they will not be liable to become relatively displaced or disarranged.

The invention also contemplates the provision of anti-skid devices which may be readily rendered active or inactive as road conditions may require.

In the accompanying drawings: Figure 1 is a side elevation of the armor applied to a vehicle tire and wheel. Fig. 2 is a similar view in detail and partly in section. Fig. 3 is a plan view of a portion of the armor. Fig. 4 is a vertical transverse sectional view through one of the armor sections applied to a solid tire. Fig. 5 is a detail sectional view, illustrating the means for securing the links which connect the sections comprising the armor. Fig. 6 is a detail perspective view of one of the armor sections. Fig. 7 is a view similar to Fig. 2, illustrating a slightly modified form of connection between the sections. Fig. 8 is a similar view, illustrating the armor applied to a pneumatic tire. Fig. 9 is a view similar to Fig. 5, illustrating another method of securing the connecting links.

Corresponding and like parts are referred to in the following description and indicated in all the views of the accompanying drawings by the same reference characters.

In the drawings, the numeral 1 indicates in general a vehicle wheel to the tire 2 of which the armor embodying the present invention is to be applied. The armor comprising the present invention is made up of a number of sections connected in an annular series and each of these sections comprises a metallic block 3, the tire engaging and tread faces of which are curved from end to end of the block to conform to the curvature of the tire. Each block has its end faces 4 located in radial planes of the wheel when the armor is in place upon the tire and the side faces 5 of each block are preferably relatively inclined, as shown in Figs. 4, 5 and 6 of the drawings, so that the blocks at their tread surfaces are of slightly less width than at their tire engaging sides. Each block is formed at each side with a longitudinally extending lip 6 projecting at an angle from the inner or tire engaging surface of the block, and by reference to the several figures of the drawings, it will be observed that the said faces of the blocks are so formed as to snugly embrace the tread surface of the tire whether the tire be of the solid or of the pneumatic type, the lips 6 embracing the sides of the tire. Each side face 5 of each block is formed between the ends of the block with an outstanding lug 7 which projects inwardly beyond the edge of the respective tire engaging lip 6, and the inner or opposing faces of these lugs are of such contour as to snugly fit the tire surface. A stud 8 is formed upon the outer face of each lug 7 and these studs are provided with threaded sockets 9 for a purpose to be presently explained. In connecting the sections comprising the armor in an annular series, it is preferable that the connection employed be of such character as to permit of the sections being connected together in the series so that their ends will lightly but not firmly contact, and while various forms of connections may be employed for this purpose, the connection here shown is in the nature of a turn buckle including an interiorly threaded sleeve 10 and links 11 which have threaded stems 12 and flattened heads 13, each provided with an opening 14 of a diameter to receive the stud 8. The stems of the links are threaded into the sleeves of the turn buckle connections, and it will be observed that by turning the sleeve, the links may be relatively adjusted, or, in other words, may be drawn together in applying the tire armor or allowed to separate in removing the same from the tire. In order that the turn buckle connections may be held at adjustment, jam nuts 15 are threaded onto the stems of the links and may be tightened to bear against the opposite ends of the respective sleeve 10. By reference to Figs. 2, 4 and 5 of the drawings, it will be apparent that in assembling the parts comprising the armor, the flattened ends 13 of the links are engaged over the studs upon the armor sections and screws 16 are then fitted into the threaded sockets in the studs and serve to hold the links against disengagement from the studs, a washer 17 being preferably disposed upon the end of each stud so that the ends of the links may have pivotal movement upon the studs without likelihood of loosening the screw 16. If found expedient, a cotter pin 18 and a washer 19 may be employed, as illustrated in Fig. 9 of the drawings, in preference to the screws 16 and washers 17, the cotter pins being fitted through openings in the ends of the studs, as shown in the said figure.

From the foregoing, it will be apparent that the links may be readily assembled with the studs upon the armor sections and the sleeves 10 turned so as to draw the links together and consequently draw the sections together and with their ends barely contacting throughout the entire series, these meeting ends being, as before stated, radial to the wheel. It will also be apparent that the armor, when in place upon the tire, presents a continuous, smooth and unbroken tread surface and that a smooth and continuous surface is presented to the tread surface of the tire, the armor snugly fitting the tire surface not so tightly as to bind or injure the tire, but yet sufficiently so to prevent creeping of the armor about the tire, or undue frictional contact between the armor sections and the tire surface.

While, as above stated, the sections comprising the armor are connected with their ends lightly contacting, the armor will, nevertheless, under working conditions, permit of the necessary yielding of the tire to secure the full benefit of its cushioning effect. If greater flexibility is desired, however, a connection such as shown in Fig. 7 of the drawings may be employed. This form of connection includes a link member having a tubular stem 20 and a link member having a stem 21 slidably fitting through the end of the first-mentioned stem, and upon the stem 21 and within the stem 20 is fitted a compression spring 22 which bears at one end against the partly closed end 23 of the stem 20 and at its other end against a pin or other stop element 24 at the end of the stem 21. In this form of connection the links are yieldably drawn together as are consequently the sections connected by the links, and it will be apparent that the sections may slightly separate against the tension of the spring 22 as pressure is imposed upon the armor and tire.

It is preferable that the sections comprising the armor be provided with anti-skid lugs which may be adjusted to project beyond the tread surfaces of the sections or be housed within and concealed by the said sections. For this purpose each section is formed through its tread portion with one or more threaded openings 25 and adjustably threaded into each opening is an anti-skid stud 26 having an engaging end 27 and having its other end provided with a square socket 28 for the application of a suitable wrench or key, whereby the stud may be arranged to cause its engaging end to project beyond the tread surface of the section, or to cause the stud to lie wholly within its respective opening. It is preferable that the studs be of a length equal to the thickness of the tread portions of the armor sections, so that when they are adjusted to lie within the respective openings 25 their inner and outer ends will be flush with the inner or tire engaging and outer or tread surfaces of the sections, thereby presenting an unbroken and smooth surface to the tire and to the road. It will of course be understood that the studs may be removed whenever desired and therefore replaced when they become worn or broken.

Having thus described the invention, what is claimed as new is:—

The combination with a tire, of an armor fitted to the tread surface of the tire and comprising a plurality of sections arranged end to end and each provided medially of its longitudinal edges with diverging lugs having studs projecting laterally therefrom and formed with sockets, links having overlapping ends engaging pivotally over the studs and bearing against the outer faces of the diverging lugs, and retaining devices fitted into the sockets and projecting over the links.

In testimony whereof I affix my signature in presence of two witnesses.

JAMES W. WHITSETT. [L. S.]

Witnesses:
W. N. WOODSON,
JOSEPH C. ZIRKLE.